US009002566B2

(12) United States Patent
McClure et al.

(10) Patent No.: US 9,002,566 B2
(45) Date of Patent: Apr. 7, 2015

(54) VISUAL, GNSS AND GYRO AUTOSTEERING CONTROL

(75) Inventors: John A. McClure, Scottsdale, AZ (US); Steven R. Miller, Scottsdale, AZ (US)

(73) Assignee: AgJunction, LLC, Hiawatha, KS (US)

( * ) Notice: Subject to any disclaimer, the term of this patent is extended or adjusted under 35 U.S.C. 154(b) by 1462 days.

(21) Appl. No.: 12/368,855

(22) Filed: Feb. 10, 2009

(65) Prior Publication Data

US 2009/0204281 A1 Aug. 13, 2009

Related U.S. Application Data

(60) Provisional application No. 61/027,478, filed on Feb. 10, 2008.

(51) Int. Cl.
*G05D 1/02* (2006.01)

(52) U.S. Cl.
CPC ............ *G05D 1/0278* (2013.01); *G05D 1/0246* (2013.01); *G05D 1/027* (2013.01); *G05D 2201/0201* (2013.01)

(58) Field of Classification Search
CPC ... G05D 1/021; G05D 1/0231; G05D 1/0246; G05D 1/0253; G05D 1/0278; G05D 2201/0201; G05B 2219/45003; G05B 2219/45017; G06K 9/00791; A01B 79/005; A01B 69/001; A01B 69/003; A01B 69/004; A01B 69/007; A01B 69/008; G01C 21/005; B25J 9/1697
USPC .......... 701/23, 25, 26, 28, 50, 466, 469, 472, 701/500, 501, 514, 521, 523
See application file for complete search history.

(56) References Cited

U.S. PATENT DOCUMENTS

| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |

(Continued)

FOREIGN PATENT DOCUMENTS

| WO | WO9836288 | 8/1998 |
| WO | WO2009/066183 | 5/2009 |

(Continued)

OTHER PUBLICATIONS

"International Search Report and Written Opinion", International Searching Authority, PCT/US08/88070, Feb. 9, 2009, International Searching.

(Continued)

*Primary Examiner* — Spencer Patton
(74) *Attorney, Agent, or Firm* — Law Office of Mark Brown, LLC; Mark E. Brown; Christopher M. DeBacker

(57) ABSTRACT

A visual, GNSS and INS (gyro) system for autosteering control uses crop row and furrow row edge visual detection in an agricultural application in order to closely track the actual crop rows. Alternatively, previous vehicle tracks can be visually detected and followed in a tramline following operating mode. GNSS and inertial (gyroscopic) input subsystems are also provided for supplementing the video input subsystem, for example when visual references are lost. Crop damage is avoided or at least minimized by avoiding overdriving the existing crops. Other applications include equipment control in logistics operations.

1 Claim, 9 Drawing Sheets

(56) References Cited

U.S. PATENT DOCUMENTS

| | | |
|---|---|---|
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A * | 9/1988 | Pryor ......................... 348/120 |
| 4,785,463 A | 11/1988 | Janc et al. |
| 4,802,545 A | 2/1989 | Nystuen et al. |
| 4,812,991 A | 3/1989 | Hatch |
| 4,813,991 A | 3/1989 | Hale |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson et al. |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvilli |
| 5,725,230 A | 3/1998 | Walkup |
| 5,731,786 A | 3/1998 | Abraham et al. |
| 5,739,785 A | 4/1998 | Allison |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |

(56) References Cited

U.S. PATENT DOCUMENTS

| | | |
|---|---|---|
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,104,978 A | 8/2000 | Harrison et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 * | 3/2001 | Keller et al. ............... 701/50 |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Ahearn et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,394 B1 | 10/2003 | Ronkka et al. |
| 6,631,916 B1 | 10/2003 | Miller |
| 6,643,576 B1 | 11/2003 | O'Connor et al. |
| 6,646,603 B2 | 11/2003 | Dooley |
| 6,657,875 B1 | 12/2003 | Zeng et al. |
| 6,671,587 B2 | 12/2003 | Hrovat et al. |
| 6,686,878 B1 | 2/2004 | Lange |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,879,283 B1 | 4/2005 | Bird et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,961,018 B2 | 11/2005 | Heppe et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,155,335 B2 | 12/2006 | Rennels |
| 7,162,348 B2 | 1/2007 | McClure et al. |
| 7,191,061 B2 | 3/2007 | McKay et al. |
| 7,221,314 B2 | 5/2007 | Brabec et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altmann |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,099 B2 | 4/2009 | Zhodzishsky et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2003/0014171 A1 | 1/2003 | Ma et al. |
| 2003/0093210 A1 | 5/2003 | Kondo et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0124605 A1 * | 7/2004 | McClure et al. ......... 280/456.1 |
| 2004/0212533 A1 | 10/2004 | Whitehead |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0031664 A1 | 2/2006 | Wilson et al. |
| 2006/0149472 A1 * | 7/2006 | Han et al. ................. 701/214 |
| 2006/0167600 A1 | 7/2006 | Nelson et al. |
| 2006/0206246 A1 | 9/2006 | Walker |
| 2006/0215739 A1 | 9/2006 | Williamson et al. |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |

(56) References Cited

U.S. PATENT DOCUMENTS

| | | |
|---|---|---|
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu et al. |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | Van Diggelen et al. |
| 2010/0121577 A1 | 5/2010 | Zhang et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva |
| 2010/0220004 A1 | 9/2010 | Malkos et al. |
| 2010/0220008 A1 | 9/2010 | Conover et al. |
| 2010/0222076 A1 | 9/2010 | Poon et al. |
| 2010/0225537 A1 | 9/2010 | Abraham |
| 2010/0228408 A1 | 9/2010 | Ford |
| 2010/0228480 A1 | 9/2010 | Lithgow et al. |
| 2010/0231443 A1 | 9/2010 | Whitehead |
| 2010/0231446 A1 | 9/2010 | Marshall et al. |
| 2010/0232351 A1 | 9/2010 | Chansarkar et al. |
| 2010/0235093 A1 | 9/2010 | Chang |
| 2010/0238976 A1 | 9/2010 | Young |
| 2010/0241347 A1 | 9/2010 | King et al. |
| 2010/0241353 A1 | 9/2010 | Park |
| 2010/0241441 A1 | 9/2010 | Page et al. |
| 2010/0241864 A1 | 9/2010 | Kelley et al. |

FOREIGN PATENT DOCUMENTS

| | | |
|---|---|---|
| WO | WO-2009082745 | 7/2009 |
| WO | WO2005/119386 | 10/2009 |
| WO | WO2009126587 | 10/2009 |
| WO | WO2009/148638 | 12/2009 |
| WO | WO-2010005945 | 1/2010 |
| WO | WO-2010104782 | 9/2010 |
| WO | WO-2011014431 | 2/2011 |

OTHER PUBLICATIONS

"International Search Report", PCT/US09/039686, (May 26, 2009).
"International Search Report", PCT/US09/33693, (Mar. 30, 2009).
"International Search Report", PCT/AU/2008/000002, (Feb. 28, 2008).
"International Search Report", PCT/US09/49776, (Aug. 11, 2009).
Keicher, R. et al., "Automatic Guidance for Agricultural Vehicles in Europe", *Computers and Electronics in Agriculture*, vol. 25, (Jan. 2000),169-194.
Bevly, David M., "Comparison of Ins v. Carrier-Phase DGPS for Attitude Determination in the Control of Off-Road Vehicles", *ION 55th Annual Meeting*; Jun. 28-30, 1999; Cambridge, Massachusetts; pp. 497-504.
Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.
Irsigler, M et al., "PPL Tracking Performance in the Presence of Oscillator Phase Noise", *GPS Solutions*, vol. 5 No. 4, pp. 45-57 2002.
Kaplan, E D., "Understanding GPS: Principles and Applications", *Artech House*, MA, 1996.
"ISO", *11783 Part 7 Draft Amendment 1 Annex, Paragraphs B.6 and B.7.ISO.11783-7 2004 DAM1 ISO*: Mar. 8 2004.
"International Search Report and Written Opinion" PCT/US2004/015678, filed May 17, 2004, Jun. 21, 2005.
Last, J. D., et al., "Effect of skywave interference on coverage of radiobeacon DGPS stations", *IEEE Proc.-Radar, Sonar Navig.*, vol. 144, No. 3, Jun. 1997, pp. 163-168.
Park, Chansik et al., "Integer Ambiguity Resolution for GPS Based Attitude Determination System", *SICE 1998*, Jul. 29-31, Chiba, 1115-1120.
Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.
Xu, Jiangning et al., "An EHW Architecture for Real-Time GPS Attitude Determination Based on Parallel Genetic Algorithm", *The Computer SocietyProceedings of the 2002 NASA/DOD Conference*

(56) References Cited

OTHER PUBLICATIONS

*on Evolvable Hardware* (EH'02), (2002).

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrev, California American Institute of Aeronautics and Astronautics, Inc., (May 2004),136-143.

"Orthman Manufacturing Co., www.orthman.com/htm;guidance.htm", 2004, regarding the "Tracer Quick-Hitch".

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, *AIAA*, Reston, VA, USA, pp. 3-50, (1995),3-50.

"International Search Report,", PCT/US09/34376, (Nov. 2, 2009).

Takac, Frank et al., "SmartRIK: A Novel Method of Processing Standardised RTCM Network RTK Information for High Precision Positioning", *Proceedings of ENC GNSS 2008*, Toulouse, France,(Apr. 22, 2008).

"International Search Report / Written Opinion", PCT/US09/63594.

"International Search Report", PCT/US09/60668.

"ISR Notification & Written Opinion", PCT/US10/26509, (Apr. 20, 2010),1-7.

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

"International Search Report", PCT/US09/33567, (Feb. 9, 2009).

"International Search Report and Written Opinion", PCT/IB2008/003796, (Jul. 15, 2009).

"International Search Report", PCT/US09/067693, (Jan. 26, 2010).

"International Search Report and Written Opinion", PCT/US10/21334, (March. 12, 2010).

Rho, Hyundho et al., "Dual-Frequency GPS Precise Point Positioning with WADGPS Corrections", [retrieved on May 18, 2010]. Retrieved from the Internet: ,URL:http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18 2010]. Retrieved from the Internet: <URL: http://www.icao.int/icao/en/ro/nacc/meetings/2004/gnss/documentation/Pegasus/tn.pdf>, (Dec. 7, 2004),p. 89 paras [0001]-[0004].

"Arinc Engineering Services, Interface Specification IS-GPS-200, Revision D", Online [retrieved on May 18, 2010]. Retrieved from the Internet;<URL: http://www.navcen,uscg.gov/gps/geninfo/IS-GPS-200D.pdf>, (Dec. 7, 2004),p. 168 para [0001].

Schaer, et al., "Determination and Use of GPS Differential Code Bias Values", Presentation [online]. Revtrieved May 18, 2010. Retrieved from the Internet: <http://nng.esoc.esa.de/ws2006/REPR2.pdf>., (May 8, 2006).

"International Search Report", PCT/US10/26509, (Apr. 20, 2010).

"International Preliminary Report on Patentability and Written Opinion", PCT/US2009/033693, Aug. 19, 2010.

\* cited by examiner

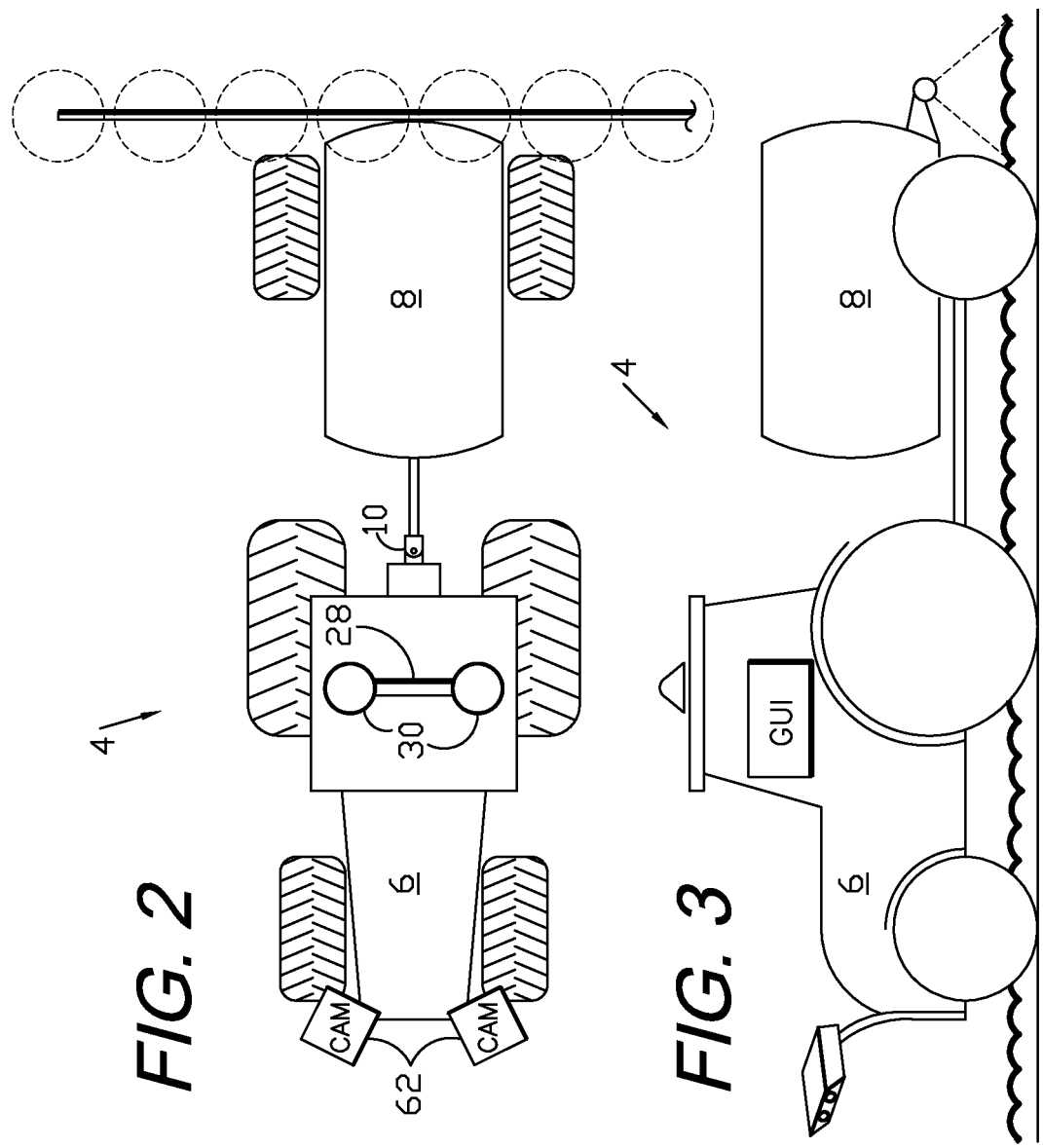

VISUAL, GNSS AND GYRO AUTOSTEERING CONTROL

CROSS-REFERENCE TO RELATED APPLICATION

This application claims priority in U.S. Provisional Patent Application No. 61/027,478, filed Feb. 10, 2008, which is incorporated herein by reference.

BACKGROUND OF THE INVENTION

1. Field of the Invention

The present invention relates generally to automated equipment control using video and other positioning inputs, and in particular to visually, automatically guiding between crop rows and against furrow row edges in agricultural applications.

2. Description of the Related Art

GNSS technology advanced vehicle and machine guidance and control in various technical fields, including the field of agricultural guidance by enabling reliable, accurate systems, which are relatively easy to use. GNSS guidance systems are adapted for displaying directional guidance information to assist operators with manually steering the vehicles. For example, the OUTBACK S™ steering guidance system, which is available from Hemisphere GPS LLC of Scottsdale, Ariz. and Hiawatha, Kans. and is covered by U.S. Pat. No. 6,539,303 and No. 6,711,501, which are incorporated herein by reference, includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

Another type of GNSS vehicle guidance equipment automatically steers the vehicle along all or part of its travel path and can also control an agricultural procedure or operation, such as spraying, planting, tilling, harvesting, etc. Examples of such equipment are shown in U.S. Pat. No. 7,142,956, which is incorporated herein by reference. U.S. Patent Application Publication No. 2004/0186644 shows satellite-based vehicle guidance control in straight and contour modes, and is also incorporated herein by reference. U.S. Pat. No. 7,162, 348 is incorporated herein by reference and discloses an articulated equipment position control system and method whereby a working component, such as an implement, can be guided independently of a motive component, such as a tractor. The implement can optionally be equipped with its own GNSS antenna and/or receiver for interacting with a tractor-mounted GNSS system.

Ideally crops would be planted in perfectly straight, evenly-spaced rows. Guidance through such fields would consist of following relatively simple straight-line patterns. Such guidance modes are commonly referred to as straight line or "A-B" in reference to the equipment traveling in a straight line between point A and point B in a repeating pattern in order to cover an entire field, which is typically flat and rectangular and therefore efficiently divided into multiple, parallel swaths. However, field conditions in many areas are not suitable for A-B guidance. For example, hilly terrain sometimes requires the formation of constant-elevation terraces.

Guidance systems accommodate such irregular conditions by operating in "contour following" modes consisting of curvilinear tracks defined by multiple GNSS points along which the equipment is guided. Initial planting passes made with manual and visually-guided navigation, which may or may not be supplemented with GNSS navigational aids, can cause crop rows to deviate from straight lines. Accommodating such irregular crop rows in subsequent operations (e.g., spraying and harvesting) may require the equipment to deviate from straight-line passes.

"Tramline" (sometimes referred to as "match tracks") is another operating mode available with some modern GNSS guidance systems. In tramline operating mode the existing crop rows are relatively well protected because the equipment follows or "matches" the previously-driven passes. The equipment wheels or tracks are thus confined between the crop rows. Machine damage from running over crops is thus avoided, or at least minimized.

Notwithstanding recent advances in GNSS-based guidance accuracy, the natural irregularities of row crop cultivation tend to compromise the effectiveness of navigation based solely on location-finding from satellite signals. Moreover, satellite signals are occasionally lost due to interference from atmospheric conditions, weather and electromagnetic fields (EMF). There are various levels of differential accuracy available for GNSS. The use of these can cause offsets and drifts, especially over the crop growth season from field preparation to harvesting. In order to compensate for such lapses in GNSS reception, inertial navigation systems (INS) with gyroscopes has been utilized for relatively short-term, supplemental guidance input. Many systems accommodate operators overriding the automated functions. For example, an operator may respond to observed, actual field conditions in order to maintain the equipment on course. A system integrating input signals from GNSS, inertial and visual guidance subsystems could optimize guidance solutions in various conditions. Moreover, visually guiding with cameras directed at the crop rows or the furrow row edges can provide relatively accurate positioning solutions, supplemented by GNSS and gyro inputs. The GNSS receivers and inertial devices (i.e. gyroscopes) can be less accurate, and hence less expensive, in such systems where the most precise positioning inputs are from visual references. Highly accurate (i.e. centimeter level) positioning with GNSS signals alone typically involves one or more relatively sophisticated and expensive receivers, and often involves subscription-based broadcast corrections or localized broadcasts from real-time kinematic (RTK) base station GNSS equipment. Custom applicators, who use their equipment on multiple farms, need guidance equipment capable of universal operation for optimizing their productivity while minimizing crop damage. Such equipment should be usable by operators with minimal training operating at optimal speeds and should have the capacity for storing and recalling field data for reuse, for example from season-to-season. Higher equipment speeds also tend to create autosteering discrepancies, which can lead to crop damage from equipment overruns. Hence, visual referencing can accommodate faster equipment even with relatively basic GNSS/INS guidance receivers and sensors. Fields are sometimes planted using a variety of guidance methods, and guidance equipment used in subsequent operations should be responsive to actual field conditions, such as crop locations, without undue reliance on previous equipment and data recorded thereby, which may or may not be sufficiently accurate for subsequent operations.

Heretofore there has not been available a GNSS, inertial and visual guidance and control system and method with the advantages and features of the present invention.

SUMMARY OF THE INVENTION

In the practice of the present invention, a system and method are provided for automatically controlling vehicles and equipment using video, GNSS and inertial input subsystems. For example, agricultural equipment comprising a tractor and an implement can be equipped with a vector position and heading sensor subsystem including a GNSS receiver and antennas and an inertial (gyroscopic) subsystem with X, Y and Z axis sensors for sensing equipment attitude changes through six degrees of freedom. The GNSS and INS/gyroscopic input subsystems can be housed in a common enclosure for mounting on the tractor roof. A video input subsystem can comprise a pair of cameras each mounted on a respective side at the front of the tractor and directed at crop rows, swath edges or previous tracks (tramlines) in the forward path of movement. A microprocessor-based controller processes the inputs and automatically controls a vehicle steering system in response thereto. Depending on the crop growth cycle and the ability for edge detection, the use of visual or GNSS/inertial systems would be nominally better if used as the primary guidance mode. This invention allows manual or transparent switching between these modes. Calibration of the recent line curvatures and offsets from previously logged GNSS tracks can be used to switch between modes while minimizing any crop damage should visual edge detection be lost. The edges can be defined by furrows, physical plants visible against soil or touching plants from adjacent rows. Other aspects of the invention include logistics equipment applications and machine control.

BRIEF DESCRIPTION OF THE DRAWINGS

FIG. 2 is a top plan view of a tractor equipped with the control system and coupled to an implement.

FIG. 3 is a side elevational view of the tractor and implement.

DETAILED DESCRIPTION OF THE PREFERRED EMBODIMENTS

I. Introduction and Environment

Figure 1:
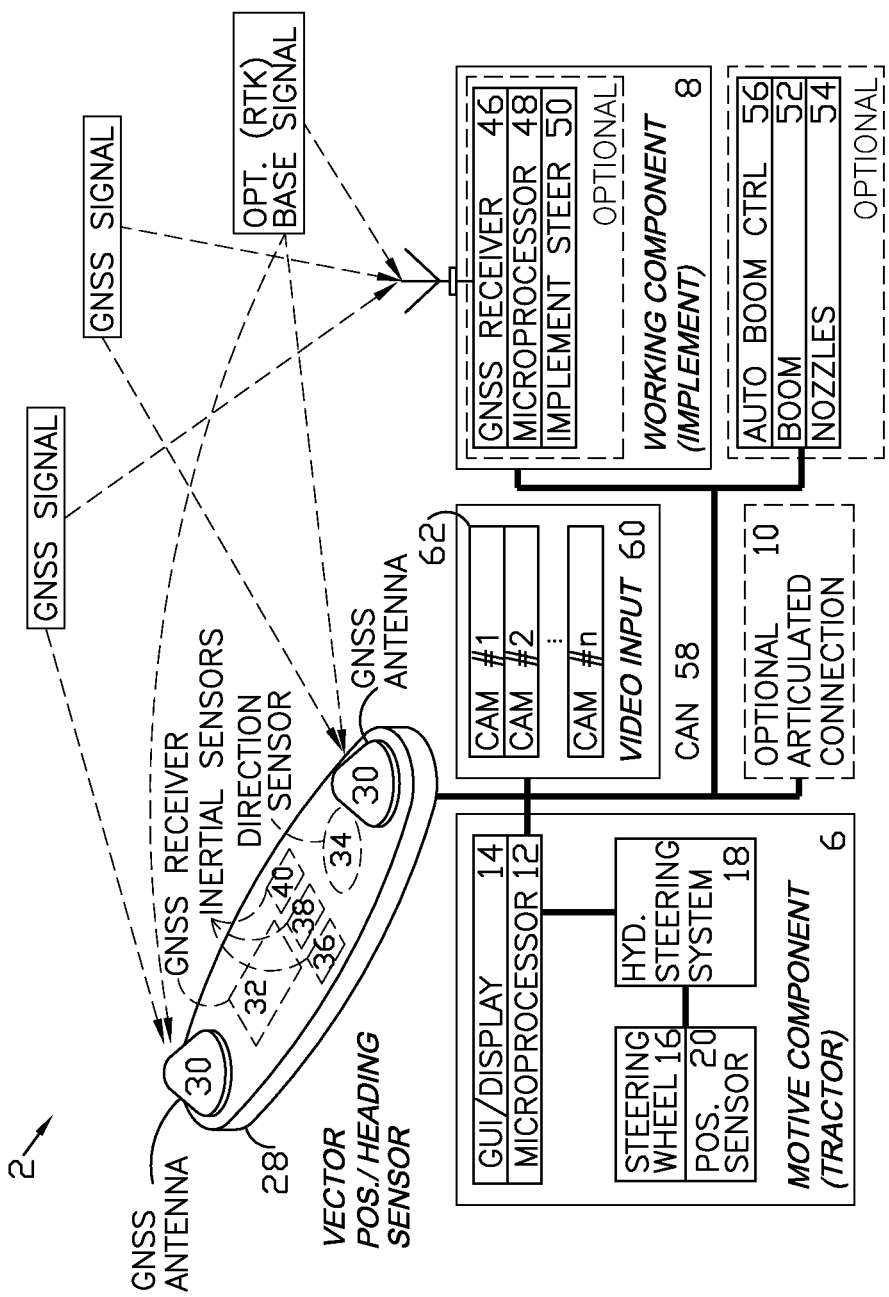
FIG. 1 is a block diagram of a vehicle control system with GNSS, inertial and video input subsystems and embodying an aspect of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

II. Preferred Embodiment System 2.

Referring to the drawings in more detail, the reference numeral 2 generally designates a GNSS, inertial and video control system embodying the present invention. Without limitation on the generality of useful applications of the control system 2, a motive component 6 connected to a working component 8 through an optional articulated connection or hitch 10 is shown (collectively a vehicle 4). Also by way of example, the motive component 6 can comprise a tractor and the working component 8 can comprise a ground-working implement. However, the position control system 2 can be applied to other equipment configurations for a wide range of other applications. Such applications include equipment and components used in road construction, road maintenance, earthworking, mining, transportation, industry, manufacturing, logistics, etc.

The control system 2 can be implemented with a tractor 6 including a microprocessor 12 connected to a graphical user interface (GUI) 14, which can be original equipment manufacture (OEM) general-purpose components, or special-purpose for the system 2. The tractor 6 also includes a steering wheel 16 for operating an hydraulic steering system 18. A position sensor 20 is connected to the steering wheel 16 and provides an output corresponding to its position. The components can be connected and external communications can be provided by suitable networks, buses, hardwired and wireless connections, controller area network (CAN) 58 (shown), serial connections and VT.

A position/heading (vector) sensor 28 can be mounted externally on the tractor 6, e.g. on its roof, and includes a pair of antennas 30 connected to a GNSS receiver 32. The GNSS receiver 32 disclosed herein can be adapted for various satellite navigational systems, and can utilize a variety of satellite based augmentation systems (SBAS). Technology is also available for continuing operation through satellite signal interruptions, and can be utilized with the system 2. The antennas 30 can be horizontally aligned transversely with respect to a direction of travel of the tractor 6, i.e. parallel to its X axis. The relative positions of the antennas 30 with respect to each other can thus be processed for determining yaw, i.e. rotation with respect to the vertical Z axis. The sensor 28 also includes a direction sensor 34 and inertial sensors 36, 38 and 40 for detecting and measuring inertial movement with respect to the X, Y and Z axes corresponding to yaw, roll and pitch movements in six degrees of freedom. Signals from the receiver 32 and the sensors 34, 36, 38 and 40 are received and processed by the microprocessor 12 based on how the system 2 is configured and programmed.

The implement (working component) 8 can optionally be equipped with an implement GNSS receiver 46 connected to an implement microprocessor 48 for steering the implement 8 independently of the tractor 6 via an implement steer subsystem 50. An optional articulated connection 10 can be provided between the tractor 6 and the implement 8. Examples of such an articulated connection and an implement steering system are described in U.S. Pat. No. 6,865,465 and No. 7,162,348, which are incorporated herein by reference. The implement 8 can comprise any of a wide range of suitable implements, such as planting, cultivating, harvesting and spraying equipment. For example, spraying applications are commonly performed with a boom 52, which can be equipped for automatic, selective control of multiple nozzles 54 and other boom operating characteristics, such as height, material dispensed, etc. Automatic boom control 56 can be utilized, for example, to selectively activate and deactivate individual spray nozzles 54 whereby overspraying previously treated areas can be avoided by the system 2 keeping track of previously treated areas and turning off the nozzles 54 when those areas are reached in an overlapping swath situation, which occasionally occurs in connection with irregularly shaped parcels, near field boundaries and in other operating situations.

A video guidance input subsystem 60 includes one or more cameras 62. In the agricultural application of the present invention described herein, the cameras 62 are adjustably mounted on each side of the front of the tractor 6 and can be oriented towards crop rows at predetermined distances ahead of the tractor 6 in a look-ahead, forward-predictive configuration. The output of the cameras 62 is received, converted and processed by the microprocessor 12 whereby the detected visual references are utilized for guidance. Without limitation on the generality of useful visual references, agricultural guidance can be based on edge detection using several methodologies depending on the growth state of the crop and rows in the soil. These include: 1) central row using the crop, soil ridge or straw residue for guidance; 2) edge row using edges on either side of the vehicle; 3) tramline following, using previous vehicle tire or tread tracks; and 4) combinations thereof.

III. Agricultural Applications

In operation, various guidance modes are available for adapting to particular field conditions. As used herein, guidance includes a graphical (visual, acoustic, etc.) interface with an operator in order to assist him or her in steering the tractor 6. Guidance also includes autosteering without operator intervention, except possibly through end-of-row turns, which can also be automated. The system 2 is initialized to select operating modes and provide various information about the equipment, such as antenna height, swath width (generally corresponding to the width of the implement 8) and other operating variables. Crop edge detection can also be used for guidance in non-row crops, such as wheat. For example, a combine creates a swath edge, which provides a visual positioning reference for the system 2.

Figure 4:
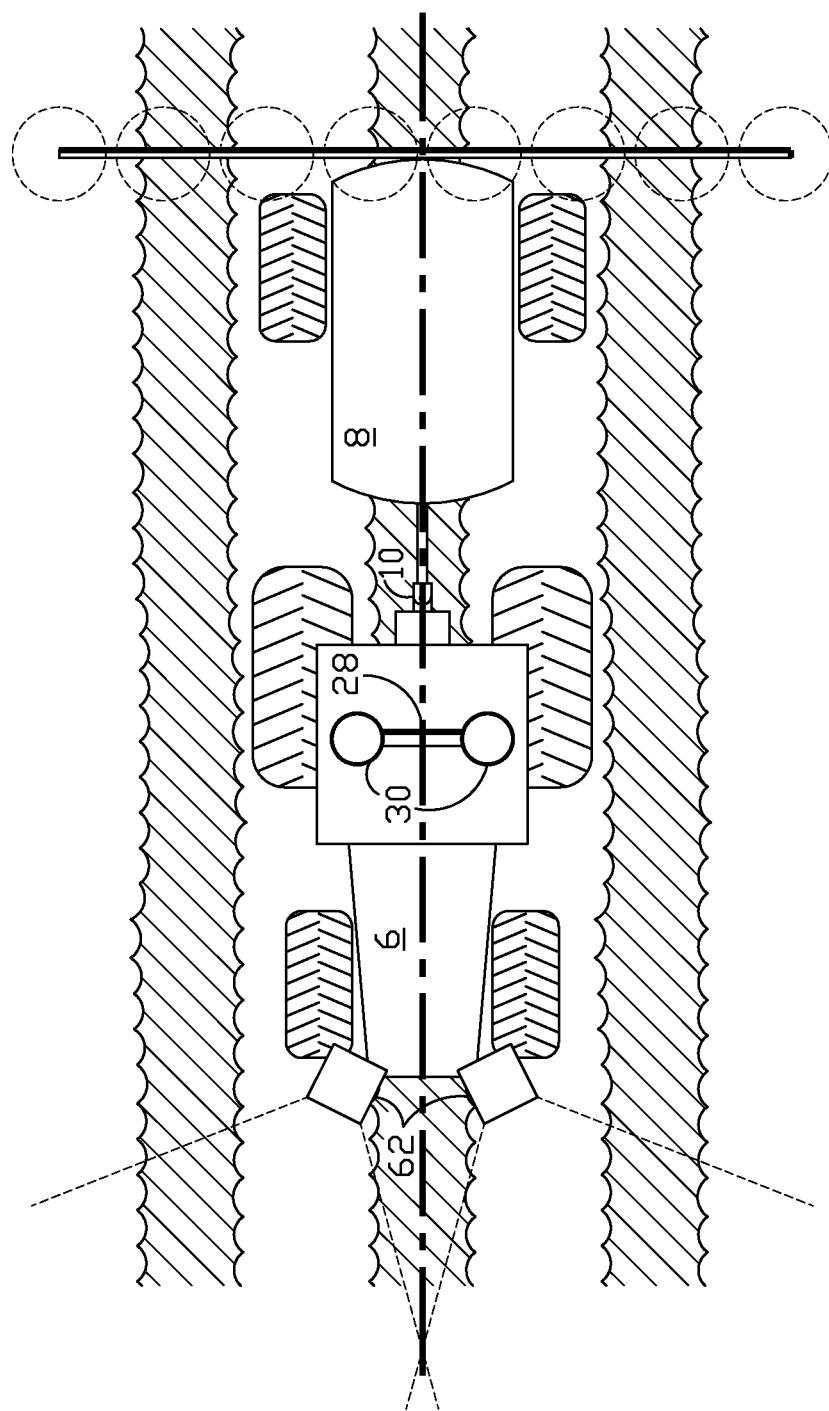
FIG. 4 is a top plan view of the tractor and implement, shown working a field planted in row crops.

FIG. 4 shows the equipment 4 comprising a tractor 6 and a sprayer 8 operating in a straight-line (A-B) mode with the cameras 62 oriented towards the edges 70 of the crop rows 72 located on either side of the equipment path. In addition to guidance, the system 2 can control the individual operation of the spray boom nozzles 54 whereby the crop rows 72 are properly treated. The microprocessor 12 can be preprogrammed to prioritize the inputs from the GNSS/INS input subsystem 28 and the video input subsystems 60. For example, the video feed can respond more directly to actual (observed) crop row conditions and locations and the microprocessor 12 can be preprogrammed to override the GNSS and INS guidance input accordingly. The inertial guidance input can be particularly helpful for maintaining the equipment on course when both GNSS and visual signals are lost or interfered with. Relatively accurate gyro guidance can be provided until GNSS and visual signals are locked and normal operations are reestablished. Inertial guidance accuracy tends to degrade and cause course drift, which can be corrected by GNSS and/or visual reference position fixes.

Figure 5:
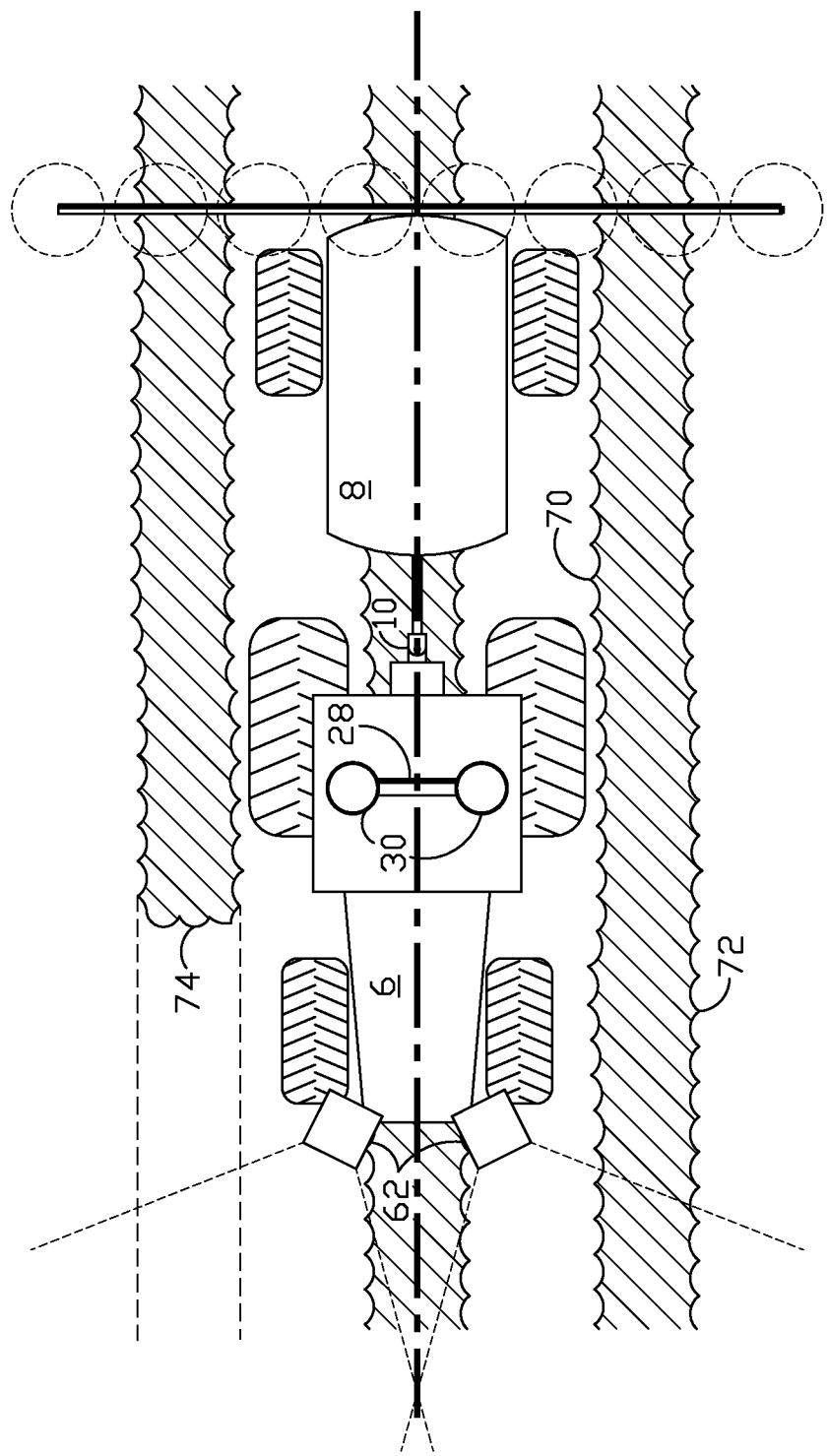
FIG. 5 is a top plan view of the tractor and implement, shown working a field planted in row crops and encountering another field condition with an interrupted crop row.
Figure 6:
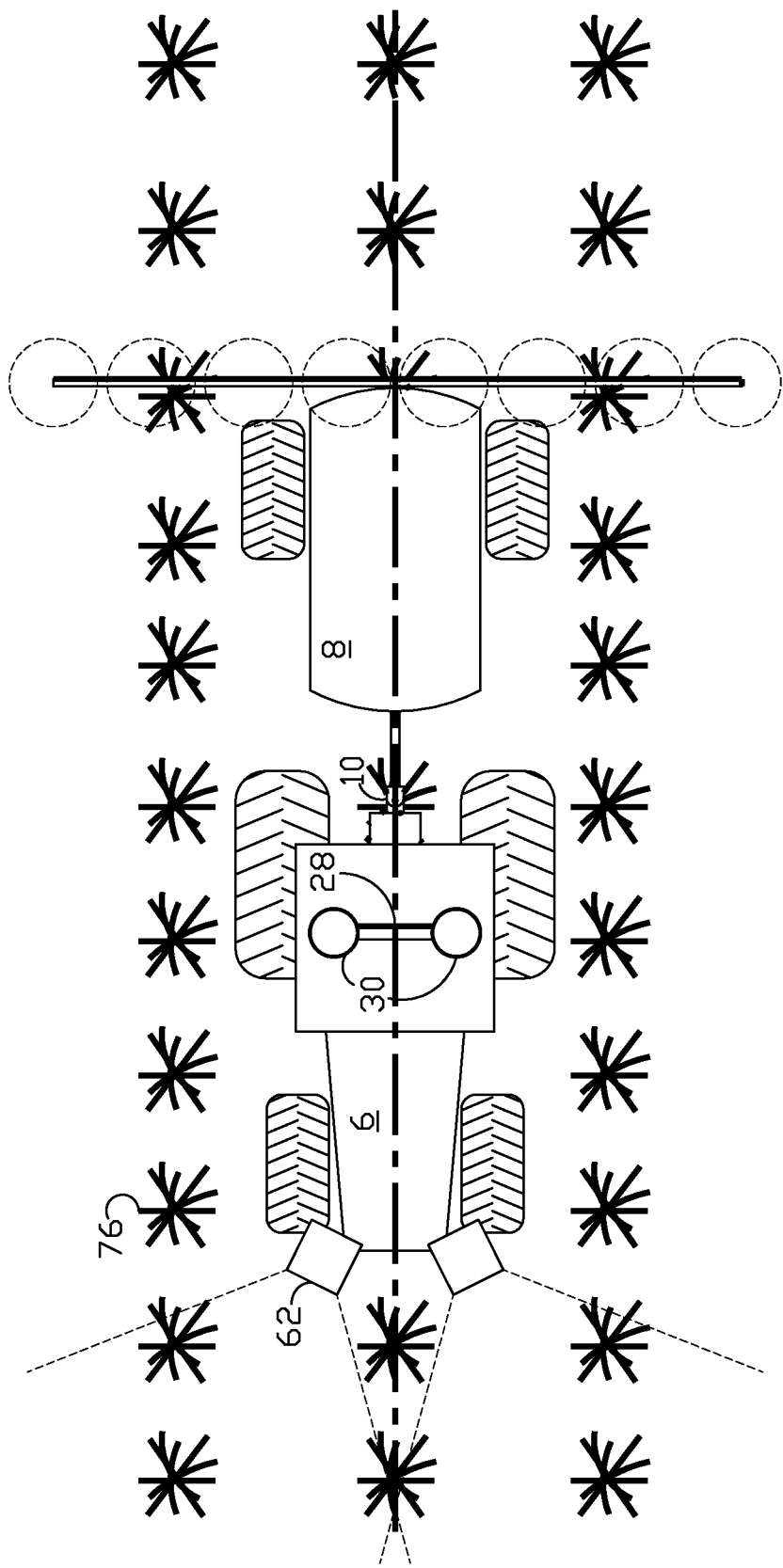
FIG. 6 is a top plan view of the tractor and implement, shown working a field planted in emerging row crops.
Figure 7:
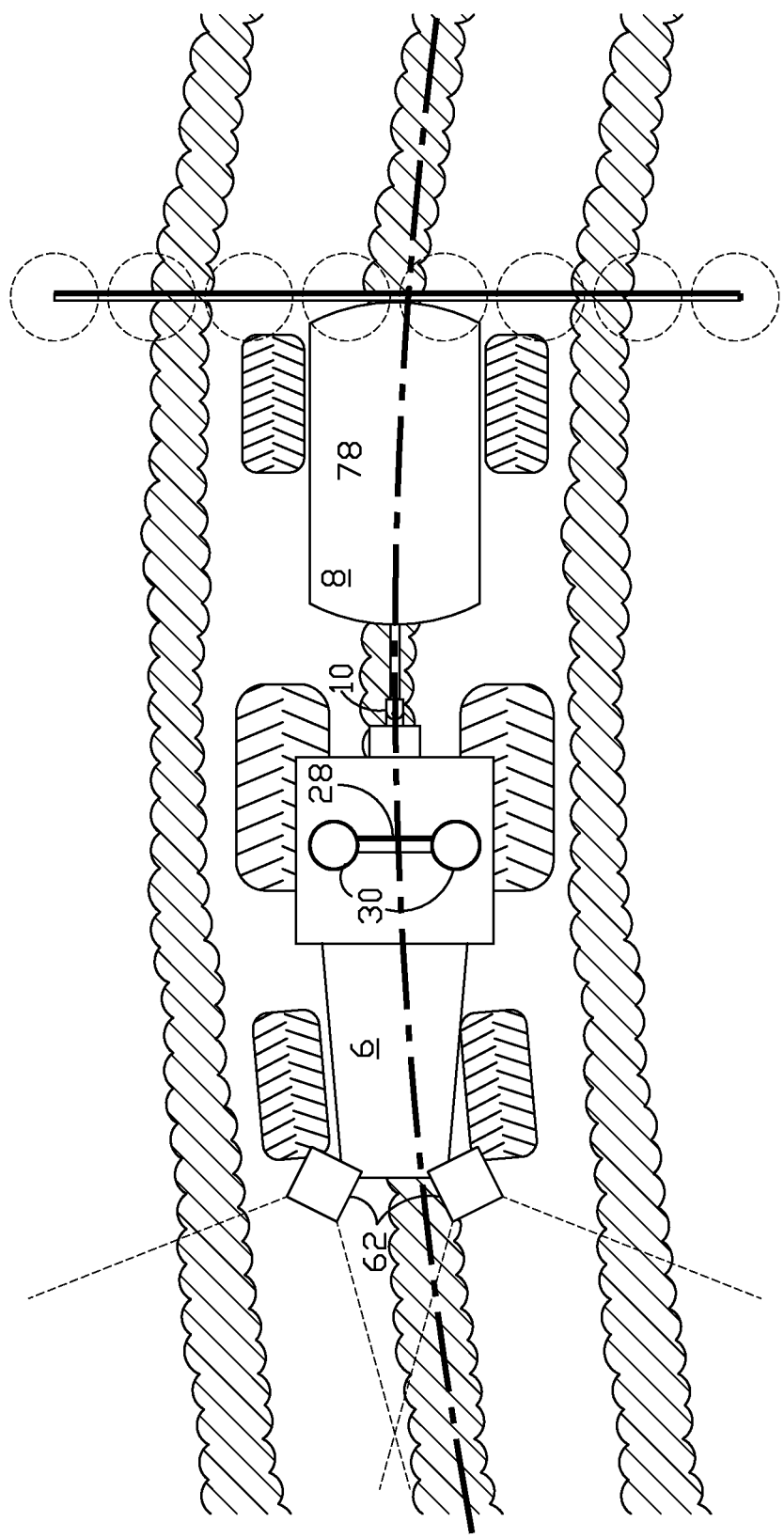
FIG. 7 is a top plan view of the tractor and implement, shown working a field planted in row crops in a contour configuration.
Figure 8:
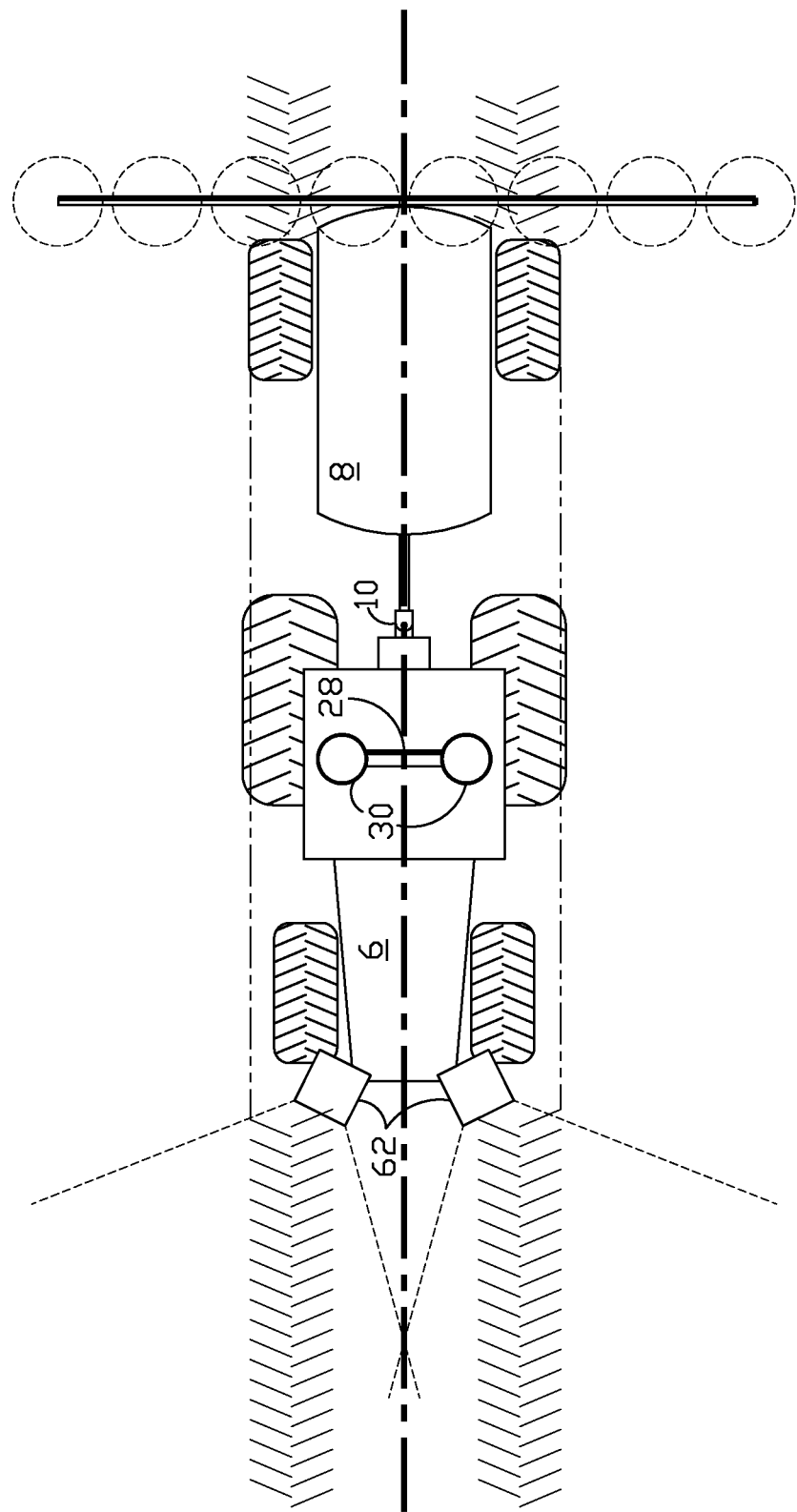
FIG. 8 is a top plan view of the tractor and implement, shown following a tramline comprising previous vehicle tracks.
Figure 9:
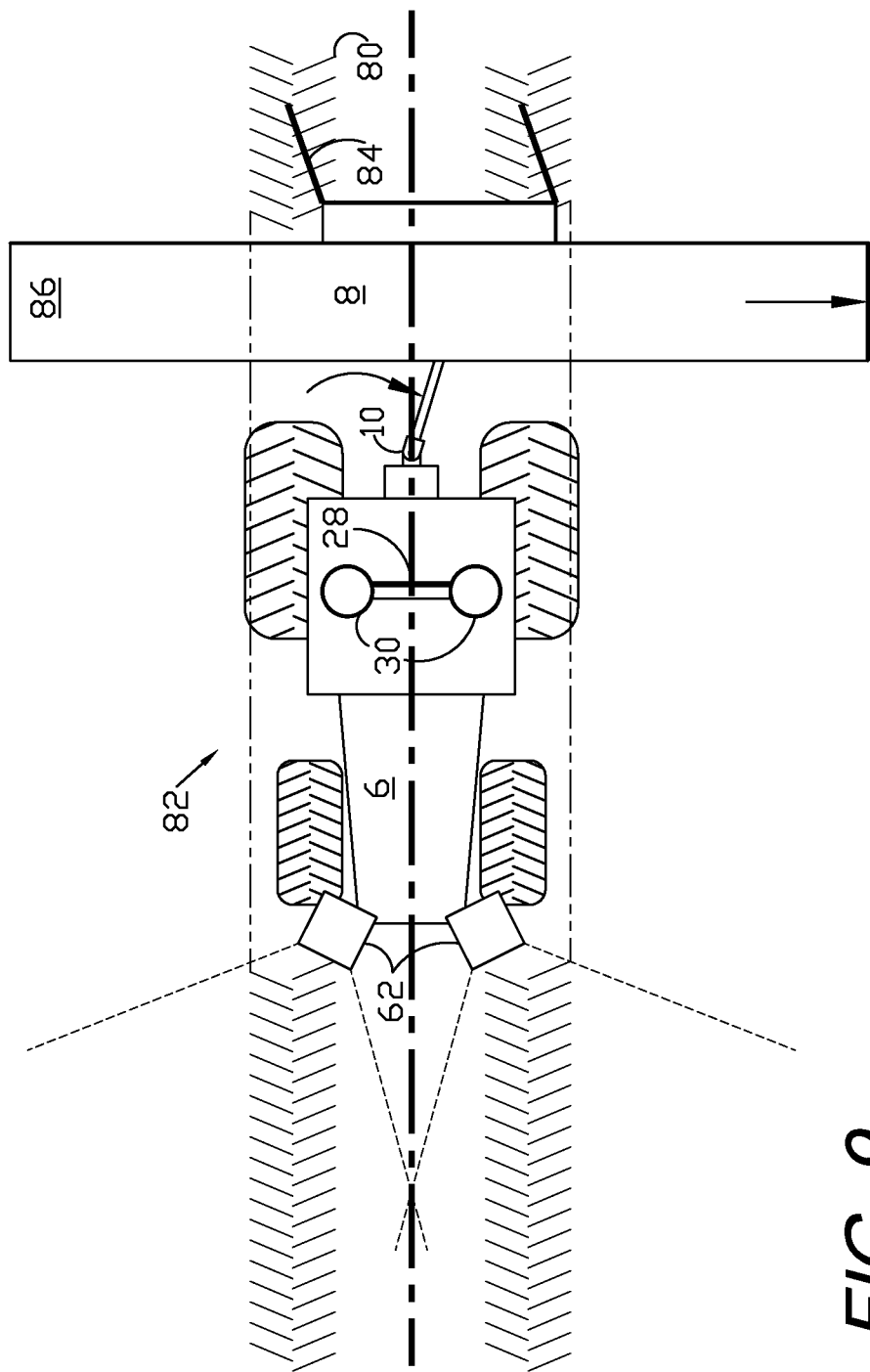
FIG. 9 is a top plan view of the tractor and an implement equipped with steering coulters.

FIG. 5 shows a field condition with an interrupted crop row condition 74, which is detected by the camera 62 and causes the microprocessor 12 to alert the operator. The system 2 can be preprogrammed to automatically prioritize GNSS/inertial guidance, or continue in a visual guidance mode by guiding off of the left side crop row edge 70. FIG. 6 shows emerging, individual plants 76, which are detected by the video guidance subsystem 22 and avoided by the equipment 4. FIG. 7 shows a contour mode of operation with visual guidance being provided by the crop row edges 70 whereby the vehicle 4 is guided along a contour guide path 78. FIG. 8 shows a "tramline following" or "match tracks" mode whereby the video guidance subsystem 22 detects and causes the vehicle 4 to follow previous tire tracks 80. FIG. 9 shows a modified vehicle 82 including an implement steering configuration whereby coulters 84 interactively guide an implement 86 and adjust for crosstrack errors of the tractor 6. U.S. Pat. No. 6,865,465 shows such an implement steering system and is incorporated herein by reference. Interactive implement guidance can also be accomplished through a power-articulated hitch tractor-implement connection 10, as described in U.S. Pat. No. 7,162,348, which is also incorporated herein by reference.

Figure 10:
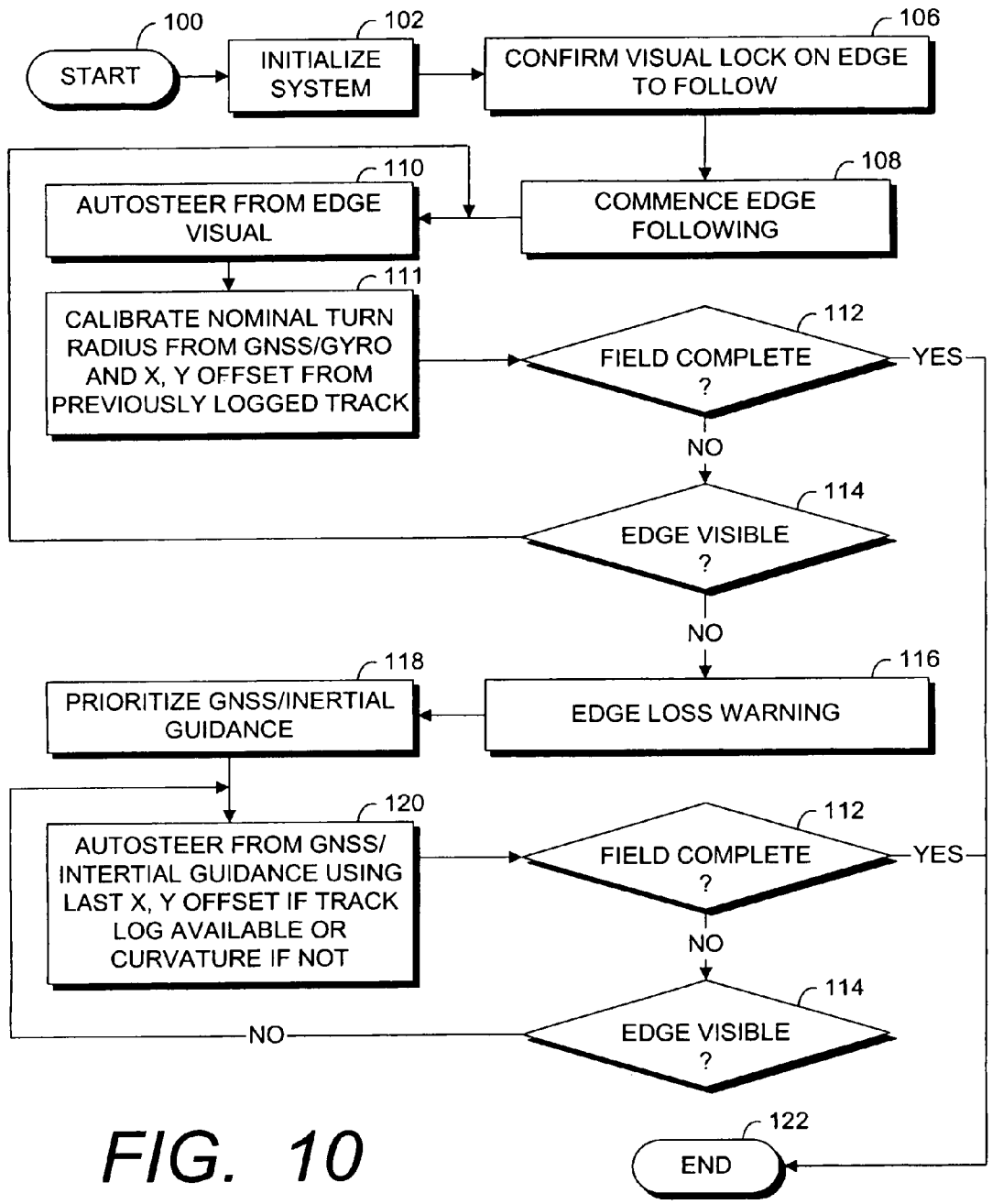
FIG. 10 is a flowchart of a GNSS, INS and video vehicle guidance and control method embodying another aspect of the present invention.

FIG. 10 shows a flowchart of a method embodying an aspect of the present invention and commencing with Start 100, whereafter the system 2 is initialized at 102 with various operating parameters, such as field course, pre-existing guidance information, swath width, etc. The track followed will be modeled as a real-time radius of curvature, both for long-term nominally straight (A-B) lines and for short-term contour following operations. Visual lock on a crop row edge 70 is confirmed at step 106 and edge following commences at 108 with autosteering enabled at 110. The GNSS/gyro input subsystems 28 provide nominal turn radius calibration and an X, Y offset from a previously logged track at step 111. Offsets from the measured crop row edge 70 are used to generate steering commands to optimize on-line performance. A field can be completely treated in visual edge-following mode. An affirmative decision at "Field Complete?" decision box 112 leads to an End at 122 and the operation is terminated. Otherwise (negative decision at 112), the operation continues with sampling of the video input subsystem 60 determining if a crop row edge 70 is visible or not at "Edge Visible?" decision box 114, with a positive decision looping back to continue autosteering in a visual guidance mode 110. A negative decision at decision box 114 leads to an "Edge Loss" warning at 116 whereafter GNSS/INS guidance is prioritized at 118 and autosteering continues based on GNSS/INS guidance using the last XY offset if a track log is available or curvature if a track log is not available at 120. If visual lock on a crop row edge 70 is lost, the track will be forward-projected and used by the GNSS/gyro system 28 to enable continuing tracking on this path. "Field Complete?" decision box 112 leads to either continuation of GNSS/inertial autosteering 120 (positive decision) or operation termination at 122 (negative decision). The system 2 also continues to look for a crop row edge 70. When detected (affirmative decision at 114) the system 2 resumes autosteering from an edge visual at 110. Original planting operations may require GNSS/inertial guidance for lack of visual crop row edges, unless previous season tracks can be visually followed. Emerging crop operations can utilize visual, GNSS and inertial guidance, all integrated by the controller 12. In full crop operations guidance within the crop rows will often be possible with visual input only, supplemented as necessary by GNSS/INS guidance in end-of-row (e.g., headlands) turns.

Other applications can benefit from the system and method of the present invention. For example, another exemplary application involves machine control in logistics operations using visual references for controlling such operations as storage and retrieval. In warehousing and dockside environments, GNSS signals are often compromised by structures and cargo containers in which the equipment operates. Visual references can therefore provide primary guidance for navigating and controlling logistics vehicles (e.g., forklifts and cranes), with GNSS and inertial supplementation. Such references can comprise, for example, painted line edges for fine positioning, character recognition for identifying slots for cargo containers and other markings on structures, shelving, containers, etc. As with the agricultural applications discussed above, relatively basic, low-end GNSS/gyro equipment may provide acceptable performance when combined with the relative precision of a video input subsystem. Data bases can be maintained with information associating reference images with GPS-defined positioning information.

It is to be understood that the invention can be embodied in various forms, and is not to be limited to the examples discussed above.

Having thus described the invention, what is claimed as new and desired to be secured by Letters Patent is:

1. A method of guiding a vehicle using visual references along a guide path thereof and GNSS positioning, which method comprises the steps of:
   providing said vehicle with a GNSS positioning subsystem including a GNSS antenna and a GNSS receiver connected to said antenna;
   providing said GNSS subsystem with a position and heading sensor including multiple antennas;
   providing a visual reference subsystem including a camera mounted on said vehicle and oriented in its direction of travel;
   providing said vehicle with a microprocessor connected to said GNSS and visual reference subsystems;
   providing said GNSS subsystem with an inertial direction sensor connected to said microprocessor;
   inputting to said microprocessor GNSS positioning information from said receiver;
   inputting to said microprocessor visual reference information from said visual reference subsystem;
   providing an inertial navigation subsystem (INS);
   generating signals corresponding to inertial forces on said vehicle with said INS;
   inputting said INS signals to said microprocessor;
   utilizing with said microprocessor said INS signals in deriving a guidance solution;
   guiding said vehicle through a field of row crops;
   providing visual references for said vehicle comprising edges of said crop rows or furrows;
   visually locking on said crop row edges or furrows with said camera;
   outputting visual reference subsystem signals to said microprocessor corresponding to said camera lock on said crop row edges or furrows;
   logging vehicle track information with said microprocessor;
   providing said vehicle with an autosteering subsystem;
   calibrating with said microprocessor nominal turn radius information for said vehicle using information derived from said GNSS and INS subsystems and offsets from a previously logged track;
   testing a crop row edge or furrow visibility condition with said microprocessor based on visual reference subsystem signals from said camera;
   detecting a crop row edge or furrow visibility loss condition with said microprocessor;
   based on said visibility loss condition prioritizing GNSS and INS guidance using an offset from previously logged GNSS tracks if a track log is available or recent line curvatures if a track log is not available;
   deriving a guidance solution with said microprocessor based on said GNSS, said INS signals, and visual reference subsystem inputs in conjunction with each other;
   guiding said vehicle with said guidance solution;
   providing said vehicle with a tractor and an implement connected thereto via an articulated hitch connection;
   providing said tractor and implement with independent steering subsystems;
   a controller providing independent steering commands to said tractor and implement steering subsystems;
   providing said implement with an implement GNSS guidance subsystem;
   inputting GNSS-derived positioning information from said implement GNSS guidance subsystem to said microprocessor;
   independently guiding said implement with said microprocessor and said implement steering subsystem;
   providing said vehicle with a spray boom including multiple spray nozzles;
   programming microprocessor to independently and selectively control said spray nozzles;
   independently and selectively controlling said spray nozzles with said microprocessor based on the positions of said spray nozzles derived from GNSS, visual reference and INS positioning information;
   deriving a nominal turn radius for said vehicle; and
   guiding said vehicle through an end-of-row turn using said nominal turn radius.

* * * * *